May 5, 1970 K. W. KAMPERT ET AL 3,509,974
INTERNAL RESISTANCE ROLLER CLUTCH
Original Filed July 21, 1966
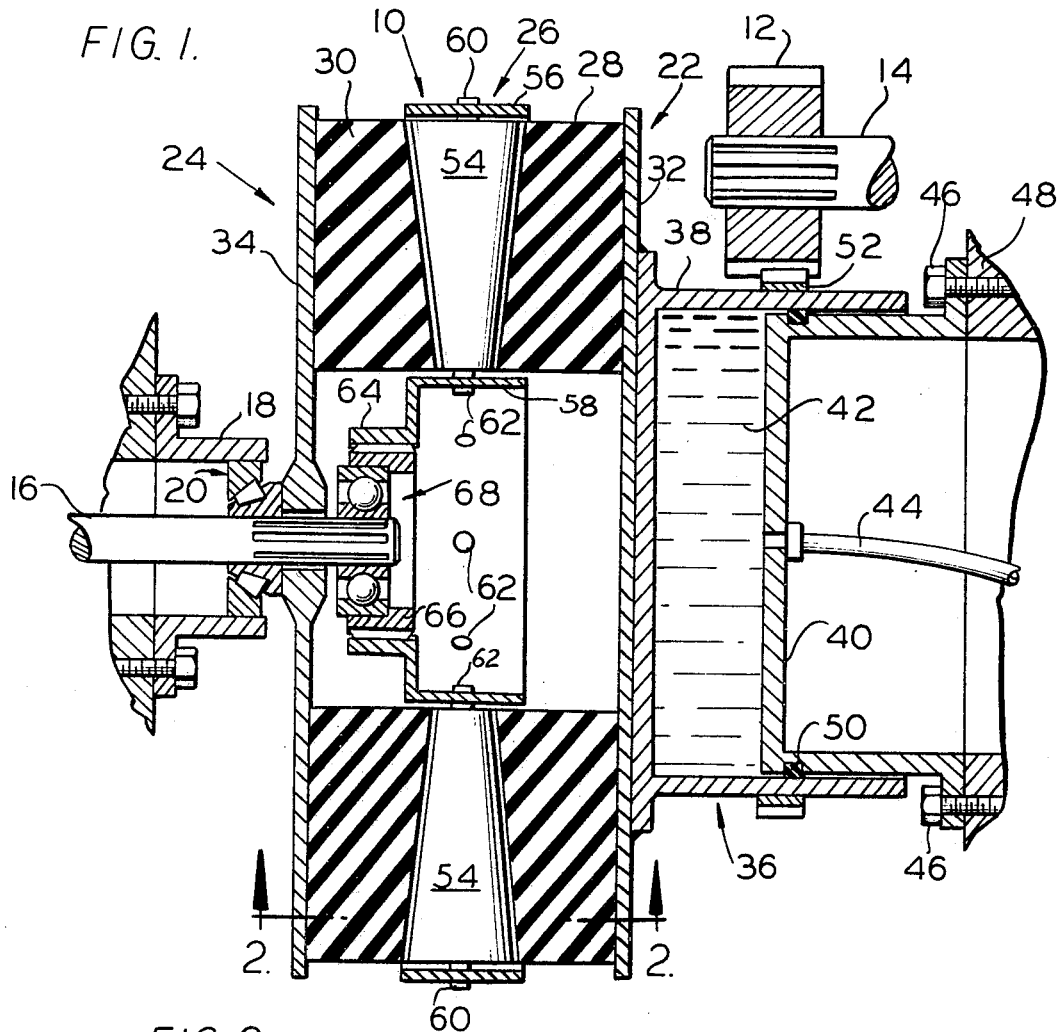
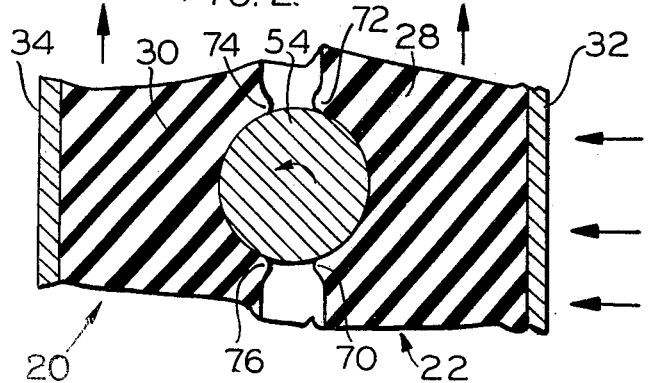
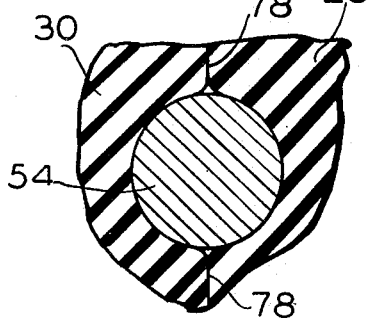
INVENTORS
KEITH W. KAMPERT
KENNETH E. HOUTZ
Richard E. Backus
ATT'Y United States Patent Office 3,509,974
Patented May 5, 1970

3,509,974
INTERNAL RESISTANCE ROLLER CLUTCH
Keith W. Kampert, Libertyville, and Kenneth E. Houtz, Streamwood, Ill., assignors to International Harvester Company, Chicago, Ill., a corporation of Delaware
Substituted for abandoned application Ser. No. 566,975, July 21, 1966. This application Oct. 1, 1968, Ser. No. 788,973
Int. Cl. F16d 25/00
U.S. Cl. 192—85
9 Claims

ABSTRACT OF THE DISCLOSURE

A clutch assembly having a power driven input plate and an output plate, a face of resilient material having high hysteresis characteristics bonded to the opposing surfaces of the plates, a roller means mounted between and engageable by the faces, and means for forcing the faces into engagement with the roller means.

---

This invention relates to a novel clutch for transferring torque between driving and driven members and more particularly relates to a clutch which transfers torque by means of the resistance developed by rollers moving against the resilient faces of rotating clutch plates.

Mechanical clutch applications present the problem of providing a design which will engage and disengage driving and driven members in a smooth, shock-free operation. It is another design objective to provide a mechanical clutch affording an efficient torque transfer which may be infinitely varied by the operator by means of a simple control system. Heretofore, no mechanical clutch design has satisfactorily provided these design objectives.

Accordingly, it is an object of the present invention to provide a clutch assembly for transferring a controlled amount of torque by utilizing the rolling resistance developed by roller members disposed between the resilient faces of relatively flat, moving members.

It is another object of this invention to provide a clutch assembly for transferring torque between driving and driven members in which a plurality of rollers contact resilient faces on opposed clutch plates and in which the rolling resistance developed as the rollers move against the faces is controlled by varying the axial force moving the clutch plates together.

Still another object is to provide a clutch assembly for transferring torque through the rolling resistance developed between clutch plates having resilient faces which contact roller members whereby the torque transfer is a function of the normal force of the faces against the rollers and in which a lock-up condition of the clutch is effected by increasing the normal force until the rollers are embedded to the extent that surface contact is effected between the faces.

Other objects and advantages of the present invention will become apparent to those skilled in the art when the following specification is read in conjunction with the accompanying drawings, wherein:

FIG. 1 is a side elevation cross-sectional view illustrating a clutch assembly embodying features of the present invention;

FIG. 2 is an enlarged cross-sectional view of the clutch assembly taken along the line 2—2 of FIG. 1 illustrating partial engagement of the clutch plates; and FIG. 3 is a cross-sectional view similar to FIG. 2 illustrating a lock-up condition of the clutch assembly.

Referring now to the drawings and particularly FIG. 1 a preferred embodiment of the clutch assembly of the present invention is illustrated generally at 10. The clutch assembly 10 is controlled by the operator to transfer a variable amount of torque between driving and driven members. The driving member comprises a pinion gear 12 keyed on input shaft 14 which in turn is operatively connected with a prime mover (not shown). The driven member comprises an output shaft 16 rotatably mounted on housing 18 by means of bearing assembly 20 and operatively connected with any desired mechanism, such as a transmission (not shown).

The clutch assembly 10 comprises a pair of clutch plates 22 and 24 rotatably mounted about a common axis. The first clutch plate 22 is in driving engagement with the pinion gear 12 while the second clutch plate 24 drives the output shaft 16. A roller assembly 26 is mounted between the clutch plates and functions to transfer torque between the plates in a manner to be presently described.

The clutch plates 22 and 24 comprise annular resilient faces 28 and 30 bonded to respective backing plates 32 and 34. The resilient faces are in confronting relationship and have a frusto-conical configuration adjacent to the roller assembly 26. It is contemplated that the design may be modified whereby one substantially flat plate is mounted adjacent to a conical plate.

The material of the resilient faces is selected to provide high hysteresis characteristics to produce the desired torque transfer. Among the materials having such characteristics are elastomers such as rubber or neoprene. As the resilient faces 28 and 30 move against the assembly 26 the inherent hysteresis of the material will develop a rolling resistance against the rollers which in turn will provide a torque transfer between the clutch plates. The operator may control the magnitude of this torque by means of varying the normal force of the clutch plates against the rollers. This torque is a function of the normal force since the amount of rolling resistance developed in the clutch depends on the extent to which the rollers are embedded in the resilient faces.

In the preferred embodiment of this invention the normal force is varied by means of an extensible hydraulic cylinder 36 which operates responsive to fluid pressure controlled by the operator. The cylinder 36 comprises a cylindrical member 38 secured to backing plate 32 by suitable means such as welding. The cylindrical member is mounted on piston 40 for rotating and axially sliding movement. Cylinder 36 extends responsive to fluid pressure within the chamber 42 formed between the cylindrical member and piston. Fluid under pressure is directed into the chamber by means of conduit 44 from a conventional hydraulic control circuit (not shown). The piston 40 may be anchored to a suitable mounting frame 48 by means of bolts 46. Annular seal 50 is positioned in an annular groove formed in piston 40 to provide a fluid-tight seal for the chamber 42.

Power from the driving member is transferred to the clutch plate 22 by means of a ring gear 52 secured to cylindrical member 38. The ring gear 52 is in driving engagement with pinion gear 12. The pinion gear is of sufficient axial length to remain in driving engagement with the ring gear throughout the full range of axial movement of cylindrical member 38.

The roller assembly 26 comprises a plurality of circumferentially spaced tapered rollers 54 caged for rolling engagement with the resilient faces about an annular path concentric with the axis of rotation of the clutch plates. The rollers are caged to move in this path by means of a pair of concentric annular supports 56 and 58. The tapered rollers are positioned with their large diameters journaled in support 56 by means of stub shaft 60, and with their small diameters journaled in support 58 by means of stub shaft 62. The rollers are formed with their end diameters proportional to the diameter of the path which a respective end travels about the axis of the clutch assembly.

The roller assembly 26 is mounted for rotation about the axis of the clutch assembly and, in addition, is arranged for axial displacement as the hydraulic cylinder 36 is extended and retracted for respective engagement and disengagement of the clutch. This axial displacement is afforded through a slip spline connection between internal teeth formed on annular reduced portion 64 of support 58 and external teeth formed on a collar member 66. Rotational support for the roller assembly is provided by ball-bearing assembly 68 having its outer race secured to the inner diameter of collar member 66 and its inner race secured to output shaft 16.

With the driving member in operation the clutch assembly 10 is disengaged when fluid pressure in chamber 42 is at a low value and the clutch plates are out of contact as in the position illustrated in FIG. 1. Clutch plate 22 will now rotate freely with respect to roller assembly 26 and clutch plate 24. Engagement of the clutch is initiated through a gradual increase of pressure in chamber 42 under influence of the hydraulic control circuit. The hydraulic cylinder 36 will extend and the rotating resilient face 28 will contact the rollers 54. The roller assembly 26 will now rotate about the clutch axis and simultaneously be axially displaced to clutch plate 24 until the rollers 54 contact the resilient face 30.

The axial force of the clutch plates against the rollers will gradually embed each roller into the resilient faces. Rolling resistance between the roller members and the resilient faces will now be developed due to the hysteresis characteristics of the resilient material. With the roller member 54 partially embedded and moving counterclockwise with respect to resilient face 28, as illustrated in FIG. 2, a certain amount of energy is stored in leading portion 70 of the indentation in the material. Because of the hysteresis effect a lesser amount of energy is restored in the trailing portion 72.

The difference in energy is manifested by a resultant tangential force resisting movement of the rollers. This resisting force will in turn react at the opposite sides of the rollers against the clutch plate 24. This occurs because an identical resistance is developed as the rollers are embedded in, and roll against, the resilient face 30. In this case energy is stored in leading portion 74 while a lesser energy is restored in trailing portion 76. The summation of the forces acting about the clutch axis will produce a transfer of useful torque.

The amount of torque transferred through this rolling resistance will be a function of both the hysteresis characteristics of the material chosen and the normal force pressing the clutch plates together. Where a more elastic material having less hysteresis is utilized there will be portionally less rolling resistance. Also, where a larger force is developed by the hydraulic cylinder 38 the indentation made by the rollers in the resilient faces will be greater and thus the rolling resistance force and resulting torque will be greater.

FIG. 3 illustrates the "lock-up" condition of the clutch assembly where a one-to-one speed ratio is effected. In this condition the axial force is increased to the extent that the rollers 54 are completely embedded in the resilient material and the opposing faces are in surface contact at 78. Torque transfer between the clutch plates will now be a function of the sliding friction between the contacting resilient faces.

For rapid disengagement of the clutch assembly fluid pressure in hydraulic cylinder 36 will be released to remove the axial force of the clutch plates against the rollers. The force of the resilient faces will now react against the rollers to move the assembly 26 and clutch plate 22 into the position illustrated in FIG. 1.

Because of the viscous characteristics of the resilient material a proportion of the mechanical energy producing torque transfer will be stored in the material as heat. During operation of the clutch assembly 10 continued engagement and disengagement will result in a build-up of this heat with a consequent rise in temperature of the material. To dissipate this heat energy a conventional oil spray (not shown) may be directed against the clutch plates. Where the clutch assembly is mounted within the transmission housing of a vehicle then the transmission oil may be used for this purpose.

While the embodiment herein is at present considered to be preferred, it will be understood that numerous variations and modifications may be made by those skilled in the art, and it is intended to cover in the appended claims all such variations and modifications as fall within the true spirit and scope of the invention.

What is claimed is:

1. A clutch assembly for transmitting an infinitely variable amount of torque between driving and driven members, the assembly including the combination of: first and second clutch plates rotatable about a common axis, at least one of the plates being axially movable to and from the other of the plates, the first plate being operatively connected with the driving member, and the second plate being operatively connected with the driven member; first and second faces in confronting relationship, each face being secured to a respective first and second clutch plate, said faces being formed of a resilient material having high hysteresis characteristics; a plurality of roller members positioned between the faces and capable of being embedded therein; means to support the roller members for rolling engagement with the faces about an annular path concentric with the axis; said roller members encountering a resistance to rotation as a direct function of the depth to which they are embedded in said faces, and, actuating means to move said one plate to the other plate for embedding the roller members in the faces with a selectively variable normal force, whereby the amount of torque transmitted through the clutch assembly may be varied by controlling the depth to which the roller members are embedded in said faces.

2. The invention as defined in claim 1 wherein: at least one face has a frusto-conical configuration, each of the rollers being tapered to conform to the angular relationship between the confronting resilient faces.

3. The invention as defined in claim 1 wherein: the resilient material comprises an elastomer composition.

4. The invention as defined in claim 1 wherein: the means to support the roller members comprises a pair of concentric annular supports mounted for rotating and axial sliding movement with respect to the common axis, each roller member being mounted on the supports for rotation about a radially extending axis, the roller members further being circumferentially spaced about the common axis.

5. The invention as defined in claim 1 wherein: the actuating means comprises a hydraulic cylinder connected with said one plate and operable to selectively move said one plate to the other plate.

6. The invention as defined in claim 1 wherein: the driven members comprises a shaft mounted for rotation about the common axis, the second plate being secured to one end of the shaft; and, the roller support means comprises a collar member rotatably mounted on said one end of the shaft and a pair of concentric annular supports mounted for axial sliding movement with respect to the collar member, each of the roller members being rotatably mounted between the supports about a radially extending axis.

7. The invention as defined in claim 6 wherein: each roller member is tapered with inner and outer base segments having diameters proportional to the distance from a respective base segment to the common axis.

8. The invention as defined in claim 6 wherein: the actuating means comprises a hydraulic cylinder connected with said one plate and axially slidable on a piston; and, a ring gear secured to the periphery of the cylinder, the driving member having a pinion gear engaging the ring gear.

9. The invention as defined in claim 1 wherein: the actuating means comprises an extensible hydraulic motor operatively connected with said one plate for moving said one plate between a first position disengaging the plates from the rollers, and a plurality of operating positions embedding the rollers into the resilient faces a selected amount to effect a rolling resistance between the rollers and clutch plates.

References Cited

UNITED STATES PATENTS

| | | | |
|---|---|---|---|
| 2,956,656 | 10/1960 | Becksted | 192—30 XR |
| 3,224,540 | 12/1965 | Straub | 192—30 XR |
| 3,330,392 | 7/1967 | Garay | 192—30 XR |

BENJAMIN W. WYCHE III, Primary Examiner

U.S. Cl. X.R.

64—27; 192—30, 58